United States Patent Office 3,432,062
Patented Mar. 11, 1969

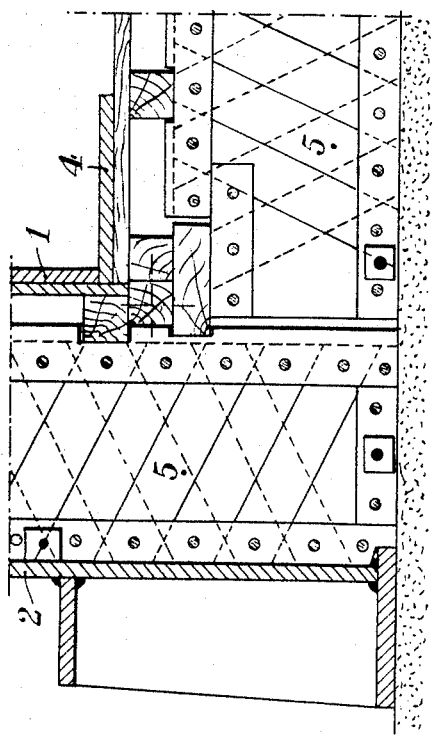
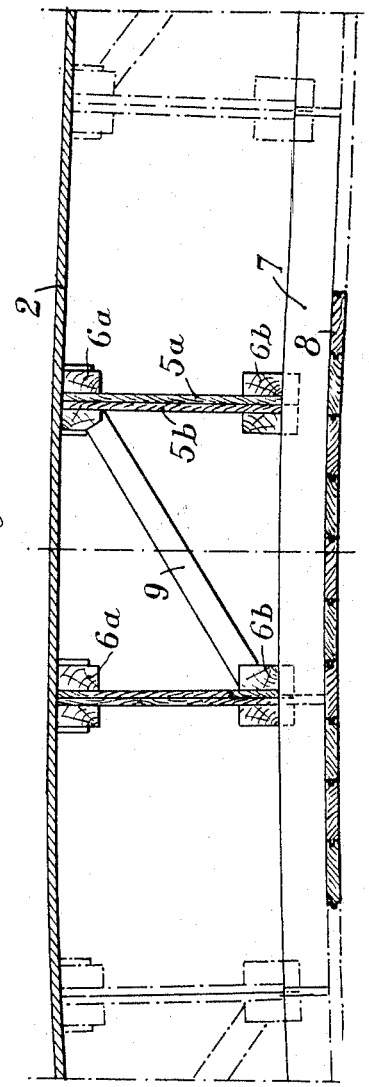

3,432,062
STORAGE TANKS FOR FLOW TEMPERATURE LIQUIDS, ESPECIALLY FOR LIQUEFIED GASES
Jacques E. Lamy, Fontenay-aux-Roses, and Pierre A. Gris, Saint-Gratien, France, assignors to Societe Anonyme Francaise de Constructions Industrielles d'Isolation Isolfeu and Societe d'Etude du Transport et de la Valorisation des Gaz Naturels du Sahara, both of Paris, France
Filed Dec. 22, 1966, Ser. No. 604,069
Claims priority, application France, Dec. 23, 1965, 43,492
U.S. Cl. 220—15    9 Claims
Int. Cl. B65d 25/00

ABSTRACT OF THE DISCLOSURE

The present invention relates to improvements in storage tanks for low-temperature liquids such as liquefied gases, of the kind comprising an inner chamber and an outer chamber supported on the same base and separated by heat-insulating material, the improvements comprising the interposition, between the lateral walls of said chambers and between the bottom of the inner chamber and its supporting base, of a wooden bracing frame embedded in the mass of insulating material and comprising a system of beams perpendicular to said chambers and spaced apart by distances which depend on the loads to which the beams are subjected, said beams being constituted by the juxtaposition of layers of strips arranged obliquely to the walls of the said chambers, in a plane perpendicular to said chambers, the obliquity of the strips of each layer being different from that of the adjacent layer. The beams are intended to transmit to the outer chamber or to the base, the forces to which the inner chamber is subjected, each beam being provided at each of its side extremities with perpendicular uprights, one of which is supported against the outer chamber, either directly or through the intermediary of a continuous sole-plate, while another upright supports a system of boards applied against the inner chamber so as to prevent deformation of the inner chamber.

The inner and outer chambers may be coupled together by chains, and the main insulation barriers may comprise a layer of stiff insulation applied against the inner face of the outer chamber, and by a filling of expanded perlite.

---

The present invention relates to tanks employed for the storage of liquids at low temperatures, especially of liquefied gases.

Containers of this kind are generally composed of a double chamber, an internal chamber containing the liquid and the external chamber in direct contact with the atmosphere. Between these two chambers is housed heat insulating material intended to lag the internal chamber.

The internal chamber is subjected to considerable contractions or expansions during the operations of filling or emptying and its movements due both to thermal variations and to variations of load and pressure, are transmitted to the insulating material and to the outer chamber. In order to limit these deformations to the maximum extent and to obtain optimum heat insulation, various solutions have been proposed, but these have always had the disadvantage of being complicated in their application and therefore costly.

These tanks must furthermore be designed as a function of their ultimate application to the liquefied gases, that is to say they must be such that if, as a result of an accident, leakages take place through the internal chamber, the insulating material opposes the passage of the liquid at very low temperature and prevents it from coming into contact with the outer chamber. It is quite obvious that the insulating compound must carry out this function with all the necessary guarantees of safety, irrespective of the deformations occurring in the inner chamber and outer chamber and this condition holds regardless of its own deformation.

The invention has as an object the provision of improvements in tanks of this type for the purpose of insuring optimum heat insulation of the inner chamber and to transmit to the outer chamber the mechanical stresses to which the inner chamber is subjected.

In accordance with the invention, a frame or brace of wood or other material having similar thermal and mechanical characteristics is interposed in the mass of heat insulation between the lateral walls of the inner chamber and the outer chamber and between the bottom of the inner chamber and the base which supports it, this frame comprising in particular a system of beams perpendicular to the said chamber, and the distance apart of which is a function of the loads to which they are subjected, the said beams having the function of transmitting to the outer chamber or to the base the forces to which the inner chamber is subjected.

These beams may be supported at one of their side extremities against the outer chamber, either directly or through the intermediary of a sole-plate. At their other side extremities, they will preferably support a continuous flooring of strips applied against the inner chamber and arranged in such manner that they absorb the deformation of the said inner chamber.

According to a characteristic feature of the invention, the beams are preferably constituted by the superimposition of layers of laths arranged obliquely with respect to the walls of the chambers in a plane perpendicular to these latter, the obliquity of the laths of each layer being different from that of the adjacent layer.

According to another characteristic feature of the invention, the flooring is constituted by laths arranged obliquely with respect to the beams and to the cross-members which join them together, and are fixed on these latter by means of a single peg fixed in their central portion, so as to permit deformation of the flooring.

In accordance with another advantageous characteristic feature of the invention, chains fixed at one extremity on the outer chamber and rigidly fast at their other extremity to the inner chamber maintain this latter in position, sealing devices being provided for the passage of the two diaphragms forming a secondary barrier.

Other characteristics and advantages of the invention will become apparent from the detailed description which follows below of a tank of the kind referred to for liquids at very low temperatures. In this description, reference will be made to the accompanying drawings, given by way of non-limitative examples, and in which:

FIG. 1 is a partial section in elevation of the lower part of the tank;

FIG. 2 is a horizontal section of the frame interposed between the outer chamber and the inner chamber of the tank;

Figure 3:
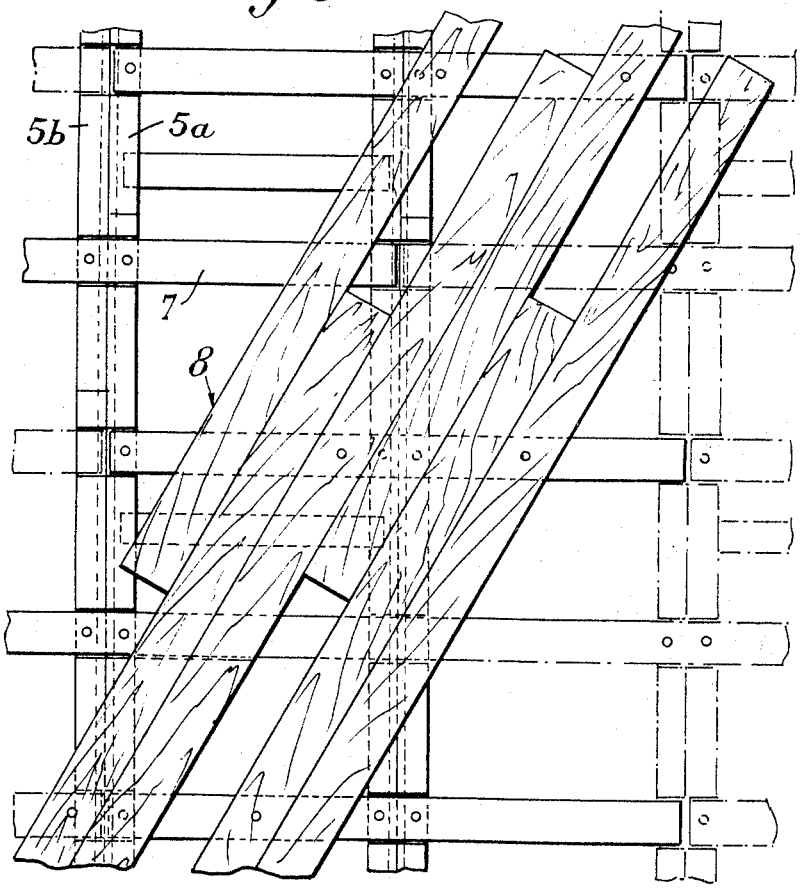
FIG. 3 is a view in elevation of this frame, showing the arrangement of the flooring.

Referring in the first place to FIG. 1, the tank is constituted by two chambers, an inner chamber 1 with thin walls forming the tank proper, and the outer chamber 2 concentric with the lateral walls of the chamber 1 and being supported on a base 3, for example of concrete. The bottom 4 of the inner chamber is also supported on this base through the intermediary of a bracing frame which will be described in detail. The tank is closed at its upper part by a conventional dome (not shown) which does not form part of the invention and which therefore will not be described.

Between the chambers 1 and 2 and between the base 3 and the bottom 4 is interposed a thermally insulating material which acts not only as a heat insulator but which also transmits to the outer portion the forces to which the inner chamber is subjected.

According to the invention, a framework of wood or any other material having the same thermal and mechanical properties is embedded in the insulating material on the outside of the inner chamber 1.

This frame comprises essentially beams 5, constituted for example by two superimposed layers of laths 5a and 5b, arranged obliquely with opposite angles of inclination for each layer, and uprights 6a and 6b which constitute respectively the foot and the head of the beam. These beams are arranged perpendicularly to the chamber 1 and to the bottom 4, the upright 6a being supported against the outer chamber 2 to which it is fixed, or against the base 3, and the upright 6b supporting horizontal members 7 on which the inner chamber 1 or the bottom 4 rests through the intermediary of floor boarding 8. As shown in FIG. 3, these floor boards are constituted by grooved wooden laths arranged diagonally with respect to the beams and to the horizontal members, and fixed at a single point on these latter, for example at their central part by a pin. The uprights 6a and 6b are joined together and reinforced transversely by cross-stays 9.

Figure 4:
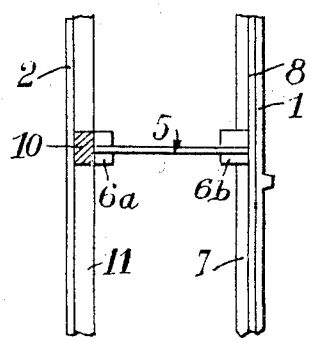
FIG. 4 is a diagrammatic view in cross-section of an alternative form of the frame.

In an alternative form illustrated in FIG. 4, the uprights 6a are not directly supported against the outer chamber, but are separated from this latter by a continuous sole-plate 10.

The insulation proper is effected by a layer of stiff insulating material 11, for example of polyurethane, applied against the wall of the outer chamber (see FIG. 4), and by a filling of expanded perlite in the spaces separating the beams.

If necessary, there may be provided secondary thermal barriers by applying, for example, an additional layer of a heat insulator over the inner face of the heat insulated layer 11, between this latter and the filling of perlite, and similarly over the inner face of the wooden flooring, between this latter and the perlite.

The roof of the tank which does not have to withstand the pressure of the liquid, is heat insulated by means of a foam of synthetic material, either in the state of blocks or forming a layer projected in situ, with the interposition of a textile reinforcement and a barrier for vapour.

Figure 5:
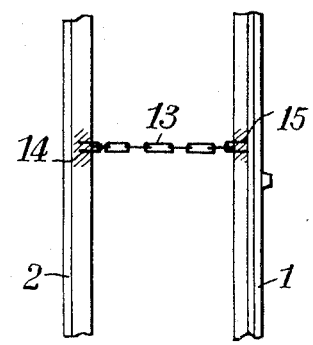
FIG. 5 illustrates the coupling of the inner chamber to the outer chamber by means of chains.

As already indicated, the inner chamber 1, which may be very thin, is held in position by means of chains 13 as shown in FIG. 5, fixed at one extremity by a plate 14 on the outer chamber and at the other extremity on the inner chamber 1 by a plate 15, all necessary arrangementes being made to ensure fluid-tightness at the passages through the secondary barriers.

It is clear that this series of arrangements insures, on the one hand, perfect heat insulation of the inner chamber, and on the other hand the transmission by the beams 5 to the outer chamber of the whole of the forces to which the inner chamber is subjected when it is full, its deformation being absorbed and compensated by movements of the flooring 8, and the maintenance in position of the inner chamber when it is empty, however thin its lateral walls may be, being ensured by the chains 13.

What we claim is:

1. In a storage tank for liquids at low temperatures, especially for liquefied gases, of the kind comprising an inner chamber and an outer chamber supported on the same base and separated by heat-insulating material, the improvement which consists of the interposition, between the lateral walls of said chambers and between the bottom of the inner chamber and the base on which it is supported, a bracing frame of wood embedded in the mass of insulating material and comprising a system of beams perpendicular to said chambers and spaced apart by a distance which is a function of the loads to which said beams are subjected, said beams being constituted by the juxtaposition of layers of strips arranged obliquely with respect to the walls of said chambers, in a plane perpendicular to said chambers, the obliquity of the strips of each layer being different from that of the adjacent layer, said beams serving to transmit to the outer chamber or to the base the forces to which the inner chamber is subjected.

2. A storage tank as claimed in claim 1, in which said outer and inner chambers are coupled together by chains intended to keep the inner chamber in position when it is empty.

3. A storage tank as claimed in claim 1, in which the main thermal insulation barriers are constituted by a layer of rigid insulation applied against the inner face of said outer chamber, and by a filling of expanded perlite in which said bracing frame of wood is embedded.

4. A storage tank as claimed in claim 3, in which two secondary heat-insualtion barriers are provided, one between the layer of rigid insulating material and the perlite and the other between the perlite and the boarding.

5. In a storage tank for liquids at low temperatures, especially for liquefied gases, of the kind comprising an inner chamber and an outer chamber supported on the same base and separated by heat-insulating material, the improvement which consists of the interposition, between the lateral walls of said chambers and between the bottom of the inner chamber and the base on which it is supported, of a bracing frame of wood embedded in the mass of insulating material and comprising a system of beams perpendicular to said chambers and spaced apart by a distance which is a function of the loads to which said beams are subjected, said beams being constituted by the juxtaposition of layers of strips arranged obliquely with respect to the walls of said chambers, in a plane perpendicular to said chambers, the obliquity of the strips of each layer being different from that of the adjacent layer, said beams transmitting to the outer chamber or to the base the forces to which said inner chamber is subjected, each beam being provided at each of its side extremities with perpendicular uprights, one of said uprights being supported directly against the outer chamber or the base and another upright supporting a boarding applied against the inner chamber so as to compensate for the deformation of said inner chamber.

6. A storage tank as claimed in claim 5, in which horizontal members are connected between said beams and said boarding is constituted by strips arranged obliquely with respect the horizontal members and to said beams, and fixed to said horizontal members at a single point.

7. A storage tank as claimed in claim 5 comprising horizontal members perpendicular to said beams and supported on said uprights, said boarding including strips obliquely arranged on and connected to the rafters.

8. A storage tank as claimed in claim 7 comprising means connecting each strip to one of said horizontal members rafters at a single point.

9. In a storage tank for liquids at low temperatures, especially for liquefied gases, of the kind comprising an inner chamber and an outer chamber supported on the same base and separated by heat-insulating material, the improvement which consists of the interposition, between the lateral walls of said chambers and between the bottom of the inner chamber and the base on which it is supported, of a bracing frame of wood embedded in the mass of insulating material and comprising a system of beams perpendicular to said chambers and spaced apart by distances which are a function of the loads to which said beams are subjected, said beams being constituted by the juxtaposition of layers of strips arranged obliquely with respect to the walls of said chambers, in a plane perpendicular to said chambers, the obliquity of the strips of each layer being different from that of the adjacent layer, said beams transmitting to the outer chamber or to the base the forces to which said inner chamber is subjected, each beam being provided at each of its side extremities with perpendicular uprights, one of said uprights being supported against the outer chamber through the intermediary of a continuous sole-plate and another upright supporting a system of boards applied against the inner chamber so as to prevent deformation of said inner chamber.

References Cited

UNITED STATES PATENTS

| | | | |
|---|---|---|---|
| 1,343,688 | 6/1920 | Shongo | 220—9 |
| 1,845,353 | 2/1932 | Snell | 220—9 |
| 3,337,079 | 8/1967 | Clarke et al. | 220—15 |
| 3,339,784 | 9/1967 | Filstead | 220—15 |

FOREIGN PATENTS 1,442,256  5/1966  France.

JOSEPH R. LECLAIR, *Primary Examiner.*

J. R. GARRETT, *Assistant Examiner.*